June 11, 1940.                    P. RINKEL                    2,203,697
HOLLOW BODIES CAPABLE OF BEING PRODUCED BY FOLDING SHEET MATERIAL
                Filed Sept. 2, 1937            2 Sheets-Sheet 1
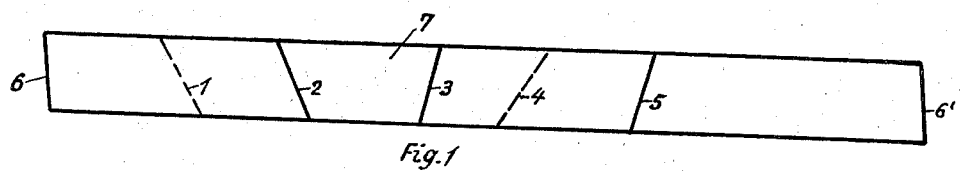
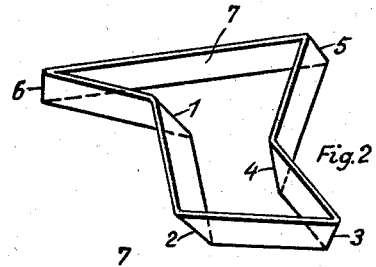
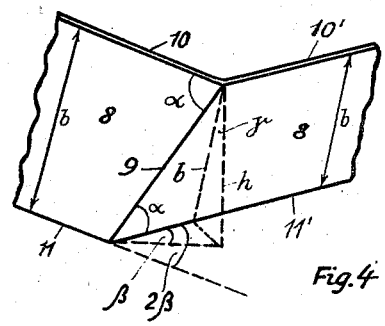
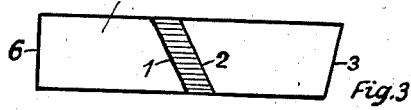
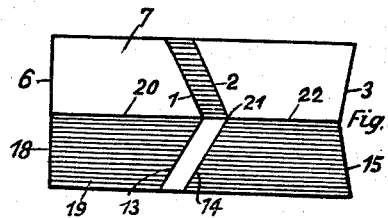
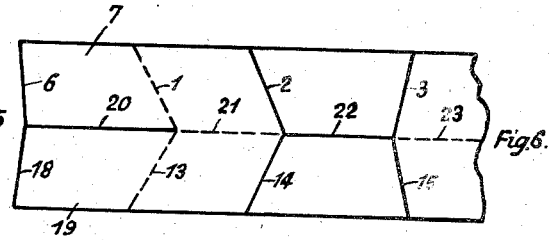
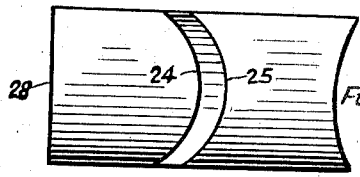
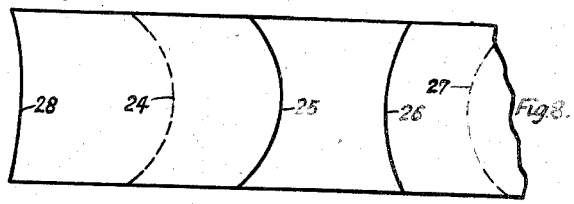
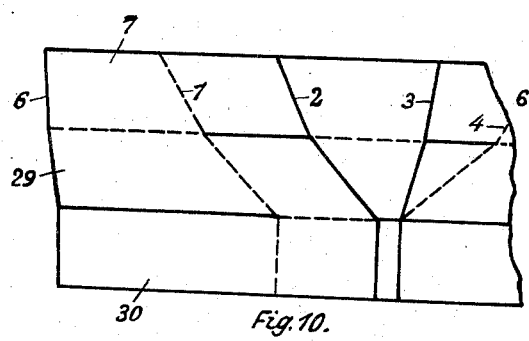
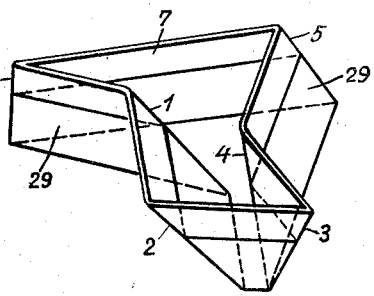
INVENTOR
PAUL RINKEL
BY
Lotka & Kehlenbeck
ATTORNEYS June 11, 1940.   P. RINKEL   2,203,697
HOLLOW BODIES CAPABLE OF BEING PRODUCED BY FOLDING SHEET MATERIAL
Filed Sept. 2, 1937   2 Sheets-Sheet 2
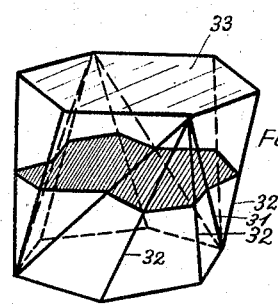
Fig.11
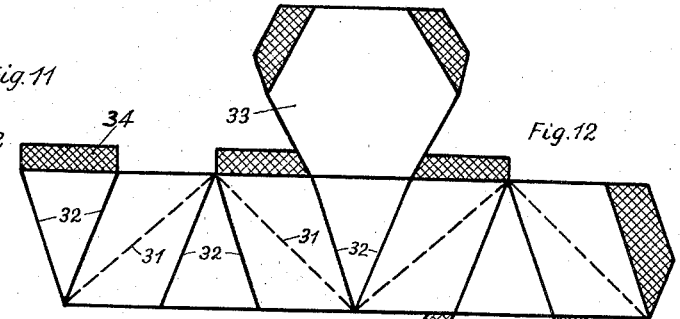
Fig.12
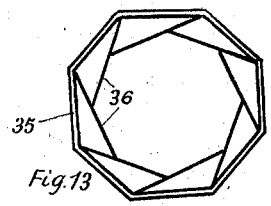
Fig.13
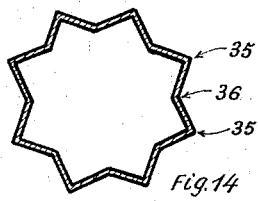
Fig.14
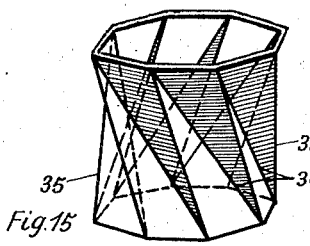
Fig.15
Fig.16
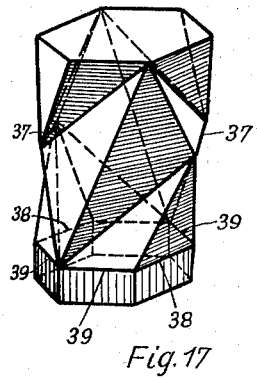
Fig.17
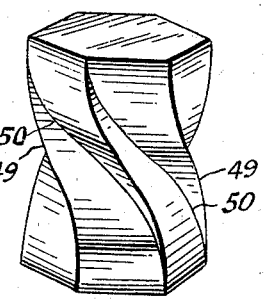
Fig.18
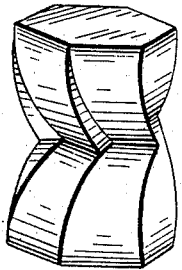
Fig.19
Fig.20.
INVENTOR
PAUL RINKEL
BY Lotka & Kehlenbeck
ATTORNEYS Patented June 11, 1940

2,203,697

UNITED STATES PATENT OFFICE 2,203,697

HOLLOW BODIES CAPABLE OF BEING PRODUCED BY FOLDING SHEET MATERIAL

Paul Rinkel, Berlin-Charlottenburg, Germany, assignor to Hans Weill, New York, N. Y.

Application September 2, 1937, Serial No. 162,106
In Germany February 10, 1937

10 Claims. (Cl. 229—16)

The present invention relates to the production of hollow bodies consisting of surfaces and edges by folding sheet material. Bodies of the kind referred to are preferably designed to be used as a packing, box or container and may further be used as ornamental articles or as structural elements for forming articles of every kind.

Known simple bodies of such a kind are for instance cubes, prisms, cylinders, pyramids and cones. It is generally known that the surrounding surfaces of these bodies are evolvable into a plane and therefore can be produced from a plane sheet without the necessity of cutting out parts or adding parts thereto or producing parts folded back upon itself.

The present invention is not concerned with these simple bodies, but with more complicated bodies the surrounding surfaces of which it would not be expected to be produced also by folding sheet material without the necessity of cutting out parts or adding parts thereto or producing parts folded back upon itself. The invention, however, shows how it is possible to find such peculiar bodies and to produce them practically provided that certain rules are followed.

A glance at the drawings which show several embodiments of the invention reveals how very varied and surprising are the bodies according to the invention although the surrounding surfaces thereof are in fact evolvable.

For reasons which will be explained hereinafter the bodies according to the invention have two characteristic features namely that at least in one partial zone of the total height thereof exist edges which have no common plane and also that the surfaces enclosing the utilisable inner space comprise inwardly directed parts.

The expression partial zone means a part of the surrounding surfaces of a body contained between two sectional planes parallel to each other and to the base on which the body may stand, the distance between the said sectional planes being a fraction of the total height of the body.

Inwardly directed parts may be defined by the condition that the straight line connecting two points thereon falls outside the body.

It is to be understood that the invention also consists in the various matters described hereinafter and claimed.

The invention will be better understood from the following description taken in conjunction with the accompanying drawings in which various embodiments of the invention are shown by way of example.

Fig. 1 shows a partial zone of a hollow body evolved into a plane.

Fig. 2 is the corresponding plan view of that zone.

Fig. 3 is the corresponding front view.

Fig. 4 is a corner of such a zone drawn on a greater scale.

Fig. 5 is a front view of a partial zone of greater height and different form.

Fig. 6 shows a part of the surface of that zone evolved into a plane.

Fig. 7 is the front view of another zone.

Fig. 8 is again a part of the surface of that zone evolved into a plane.

Fig. 9 is a plan view of another zone.

Fig. 10 is a part of the surface of that zone evolved into a plane.

Fig. 11 is a perspective view of a complete body.

Fig. 12 shows the total surface of that body evolved into a plane.

Fig. 13 is the plan view, Fig. 14 is a horizontal cross-section in the middle and Fig. 15 is a perspective view of a further example of a body according to the invention.

Fig. 16 is the surrounding surface of that body evolved into a plane.

Figs. 17, 18, 19, and 20 are perspective views respectively of further embodiments of the invention.

Figs. 1–10 are intended to aid in explaining the relationships to be known when surfaces according to the invention are to be constructed. The strip 7 of sheet material is provided with lines 1, 2, 3, 4, 5 such that when the strip is folded along the said lines and the ends 6 and 6' are made to meet, a partial zone is produced and made to stand up as shown in Figs. 2 and 3.

In Fig. 1 as well as in all the other figures illustrating evolved surfaces the folding lines shown in full (2, 3, 5, 6, 6') indicate edges which in the completed body are directed outwardly, whilst the broken lines indicate edges directed inwardly (1 and 4). Outwardly directed edges are such that the inner angle of the adjacent surfaces is smaller than 180°. Inwardly directed edges are such that the inner angle between the adjacent surfaces is greater than 180°. Therefore the edges indicated by broken lines in the involved surfaces must be formed by folding the strip in the reverse direction to that which applies to the full lines.

Referring to Fig. 4 a strip 8 of width $b$ is folded along the oblique line 9 to form an edge. The upper edge of the strip 8 is designated by 10 and 10'; whilst the lower edge is designated by 11 and 11'. 11 and 11' have a common plane which may be considered as the base on which the folded strip may stand. Since 10 is parallel to 11, and 10' parallel to 11', it follows that the plane containing the edges 10 and 10' which is the upper limit of the upstanding strip 8 is parallel to the base plane 11, 11'. The distance between the said two limiting planes is designated by $h$ and this is the height of the zone. The angle $\gamma$ between $b$ and $h$ indicates the inclination of the strip. Since the width of the strip is everywhere equal to $b$, and the zone height everywhere equal to $h$, the angle which the strip at every part makes with the vertical $h$ is constant, that is everywhere that angle must be equal to $\gamma$, but the strip on either side of a folded edge is inclined in opposite direction. This means that the angle $\gamma$ changes its sign from corner to corner; as shown in Fig. 2 which is a plan view it will be seen that the lower limiting edge of the zone is offset with respect to the upper limiting edge in such a manner that the corresponding sides of the upper and lower polygons are offset parallel to each other always by the same amount, but alternately in an outward and inward direction, with reference to the projection plane. Consequently the projections of the oblique folded edges 1, 2, 3, 4, 5, 6 on to the base plane coincide independently of their inclinations with the bisector of the external angle of the corresponding corner of the polygon. In Fig. 4 12 is the projection of the oblique folded edge 9 and also the bisector of the external angle $2\beta$ of the corner of the polygon shown.

Furthermore the following mathematical relationship may be derived from Fig. 4: let $\alpha$ be the anble between the folded edge 9 and the strip edge 10 or 11', then $$\frac{\tan \beta}{\tan \alpha} = \sin \gamma = z$$

In passing around the zone $\gamma$ is alternately positive and negative; consequently $\sin \gamma$ and therefore the ratio $$\frac{\tan \beta}{\tan \alpha}$$

alternates between the positive value and the negative value of $z$ ($+z$ and $-z$).

From this fact rules such as the following may be derived for the construction of hollow bodies from sheet material according to the invention.

1. Where the angles $\beta$ follow each other without a change of sign, that is where only outwardly directed edges (or only inwardly directed edges) follow each other, the successive angles $\alpha$ alternate in sign; that means that in the evolved surfaces the successive folding edges are inclined alternately outwards and inwards, see for instance 2 and 3 in Fig. 1.

2. Where, however, the angles $\beta$ alternate in sign, the successive angles $\alpha$ have like signs; that means that in these cases, in the evolved surfaces, the successive folding edges are inclined in the same sense, see for instance 3, 4, 5 in Fig. 1.

Subject to the above equation and to the above rules it is possible to elect arbitrarily a basic polygon and to calculate and design the evolved form of corresponding surfaces and so the hollow bodies of the kind mentioned, that is to define the necessary location of the folding lines on the sheet material and also to indicate which of the folds are to be made in one direction and which in the other sense.

It will be understood that groups of particular forms will require additional rules special for that group as will be pointed out in connection with the respective examples.

Just as above hollow bodies of the kind referred to are considered as being divisible into partial zones, so can the composition of such a hollow body be imagined as comprising a plurality of such partial zones superimposed one on the other. The only condition required is that the individual partial zones have their adjacent basic surfaces identical.

This allows of an inexhaustible multiplicity of forms of hollow bodies according to the invention the surrounding surfaces of which may be evolved.

A very simple example of this is shown in Figs. 5 and 6. In this case two partial zones are joined, the lower one being the inversion of the upper one which is identical with the zone shown in Figs. 1, 2 and 3 having folded edges 1—6. The strip 7 corresponds to the strip 19, and the edges 1—6 correspond to the edges 13—18. Fig. 6 which shows a part of the evolved surface of the body shown in Fig. 5 contains in the line of contact of the partial strips 7 and 19 (plane of contact of the partial zones) further folding edges 20, 21, 22, 23 ... which are also directed alternately outwardly and inwardly.

Since it is possible to choose at will, as indicated above, any value of $\gamma$ varying from zone to zone, so it is also possible to provide for a gradual change of the angle of inclination in the vertical direction. Thus curved side surfaces may be obtained, and it is surprising that in this manner curved folded edges are obtained which in each differential of the height thereof follow the rules indicated above.

An example is shown in Figs. 7 and 8. By comparing Figs. 5 and 7 it will be seen that the crooked line formed by the continuous edges for instance 1 and 13, or 2 and 14 are replaced by the curved lines or edges 24 and 25 respectively; furthermore it will be seen that the outwardly directed edge 20 corresponds to the convex surface lying between the curved edges 23 and 24, whilst the inwardly directed edge 21 corresponds to the concave surface lying between the curved edges 24 and 25, and so on.

It is to be noted that the plan view shown in Fig. 2 is not only that of the body illustrated in Fig. 3 but also of those shown in Figs. 5 and 7.

In order to facilitate the reading of the drawings and to show better the direction in space of the different parts of the surfaces in the figures just mentioned as well as in the figures which follow, the overhanging outwardly directed surfaces are shaded.

Figs. 9 and 10 show in a similar manner a body composed of three partial zones the uppermost of which is identical with that shown in Figs. 1–3 and is therefore provided with the same designations. On to this first zone or strip 7 is juxtaposed a second strip 29 with smaller inclination but in the same sense, and on to this second strip is juxtaposed a third strip 30 having vertical walls, that is a prism. As shown by Fig. 9, the continuous edges the parts of which have different inclinations lie in a vertical plane including the said parts.

The elementary examples described with reference to Figs. 1–10 show clearly the existence of two characteristic features common to them all. The outer surfaces surrounding the utilisable inner space comprise inwardly directed parts, and furthermore in all these cases exist edges having no common plane. Thus these features are characteristic of the bodies formed according to the invention.

The following figures illustrate practical embodiments of the invention.

Fig. 11 shows a body which is a polyhedron in which two outwardly directed edges 32 are followed in regular sequence by one inwardly directed edge 31. By the middle section shown in Fig. 11 the inwardly directed parts are made clear. Fig. 12 shows not only the evolved surfaces but also the form of a blank from which the complete body is formed including the necessary end closing members 33 and also the gluing strips 34 the latter being indicated by cross-shading.

Fig. 15 shows as a further practical example how the idea of the invention may be embodied in the surrounding surface of a single frustum of a body. In this case in the surrounding surface an outwardly directed edge 35 alternates with an inwardly directed edge 36, as also indicated in Fig. 16 which is the evolved surface. This is also clear from an inspection of Fig. 13 which is a plan view and Fig. 14 which is a middle cross section.

In both examples the inwardly directed edges have a different inclination to the outwardly directed edges. The outwardly directed edges lying on each side of an inwardly directed edge are such that they have no common plane.

The following example shows an embodiment in which the surrounding surfaces of the hollow bodies are formed by superimposing the surrounding surfaces of a plurality of frusta of bodies.

The example according to Fig. 17 is obtained by superimposing two bodies as shown in Fig. 11 and a six-sided prism. The two first-mentioned bodies are superimposed after being turned through 60° with respect to each other. This results in the peculiarity as shown in Fig. 17 that in the imaginary plane of contact only two outwardly directed edges 37 are obtained, whilst some of the meeting partial surfaces of the upper and the lower frusta are continuous one of the other thereby forming no edge, since they possess identical inclinations. In the polygon of contact between the described part of the body and the lowest prismatic part only two inwardly directed edges 38 are obtained, whilst all the remaining edges 39 are outwardly directed.

A further example of this peculiarity is shown in Fig. 20, which illustrates a hollow body of similar type as Fig. 15. The outwardly directed edges 58 correspond to the edges 35 of Fig. 15; the inwardly directed edges that would correspond to the edges 36 are absent. They are again replaced by inwardly directed curvatures of each of the partial surfaces formed automatically between two adjacent outwardly directed edges 59.

Fig. 18 shows a body the edges 49 and 50 of which are in sequence around the surface directed alternately outwardly and inwardly, exactly as shown in the example of Fig. 15. Fig. 19 shows a hollow body in which the upper half is identical with the upper half of the body shown in Fig. 18, but the lower half of which is the inversion of the upper half.

The two last mentioned cases (Figs. 18 and 19) embody the following rule. On each side of each of the curved edges lies a concave and a convex partial surface respectively. If the said edge is an outwardly directed edge, then the concave partial surface lies on the concave side of the folded edge; but if the said edge is an inwardly directed edge, then the concave partial surface lies on the convex side of the folded edge.

A body according to Fig. 18 possesses still another remarkable technical function. If the body is made of resilient material and if the internal pressure is greater than the external pressure, the body has a tendency to extend and at the same time its ends turn in opposite direction with respect to each other. Thus such a body may be used as a pressure gauge.

The final shape of a hollow body can be predetermined by providing a piece of sheet material with continuous lines which are arranged in such a manner that after the sheet is folded along the said lines and bent to bring the ends together a hollow body results having edges coinciding with the said lines. It is of secondary importance whether the said lines are actually drawn, or effected in any optical manner, or whether they are produced mechanically such as forming grooves.

Furthermore the formation of the sheet material used can be predetermined in such a way that a finished body is used as a mandrel, the said body having a shape corresponding to a hollow body according to the invention so that when a sheet material is simply wrapped around the said body it automatically takes up the same form. The said body which is to be wrapped may be firstly a hollow body for instance a folded box which is constructed and produced according to the invention and is to be provided subsequently with a further wrapping for instance transparent paper; secondly the said body may be the article itself which is to be packed or wrapped; finally it may be a framework the members of which correspond to the edges of the desired shape, whilst the surrounding surfaces are obtained by wrapping.

I wish it to be understood that I do not desire to be limited to exact details of construction shown and described, for obvious modifications will occur to a person skilled in the art.

What I claim is:

1. A hollow body capable of being produced by folding sheet material and comprising side walls, the development of said side walls constituting a strip with straight-lined and unbroken upper and lower edges parallel to each other, said body including at least one partial zone of its entire height, defined by two parallel cross-sectional planes, said partial zone comprising other edges extending from one of said planes to the other and lateral partial surfaces between said other edges respectively, at least two of said other edges having no plane in common with each other, and at least one portion of one of the circumferences of said planes being inwardly protruding.

2. A hollow body as claimed in claim 1 in which said partial surfaces and other edges are arranged in a cyclically repeated sequence around the circumference of said partial zone.

3. A hollow body capable of being produced by folding sheet material and comprising side walls, the development of said side walls constituting a strip with straight-lined and unbroken upper and lower edges parallel to each other, said body including at least one partial zone of its entire height, defined by two parallel cross-sectional planes, said partial zone comprising at least one set of other edges extending from one of said planes to the other and lateral partial surfaces, at least two of said other edges having no plane in common with each other, at least one portion of one of the circumferences of said planes being inwardly protruding, and the development of said zone forming a parallelogram in which the circumferences of said planes constitute the one pair of parallel sides, and in which said other edges are parallel to the other pair of parallel sides.

4. A hollow body capable of being produced by folding sheet material and comprising parallel top and bottom planes, side walls and two sets of lateral edges, none of said edges having a plane in common with one of the other edges of the same set, said body including partial zones of its entire height, defined by two parallel cross-sectional planes, at least one of the circumferences of each of said cross-sectional planes having inwardly and outwardly protruding corners, and the development of the side walls of said body forming a parallelogram, in which the circumferences of said top and bottom planes constitute the one pair of parallel sides, and in which one set of said edges are parallel to the other pair of parallel sides, so as to divide said parallelogram in a plurality of partial parallelograms, the other set of edges defining said inwardly protruding corners, being coincident with the longer diagonals of said partial parallelograms.

5. A hollow body capable of being produced by folding sheet material and comprising side walls, the development of said side walls constituting a strip with straight-lined upper and lower edges parallel to each other, said body including at least one partial zone of its entire height, defined by two parallel cross-sectional planes, said partial zone having curved edges extending from one of said planes to the other, and lateral partial surfaces between said curved edges respectively, the curvatures of all said curved edges having like sense, none of said curved edges having a plane in common with another one, at least one of the circumferences of said planes having portions alternately protruding inward and outward, and the development of said zone forming a strip with straight-lined and unbroken upper and lower edges parallel to each other.

6. A hollow body as claimed in claim 5 in which said curved edges alternately protrude inwardly and outwardly, each surface portion between the concave side of an outwardly protruding edge and the convex side of an inwardly protruding edge being concave, and each surface portion between the convex side of an outwardly protruding edge and the concave side of an inwardly protruding edge being convex.

7. A hollow body as claimed in claim 5 made of resilient material for use as a pressure gauge.

8. A container capable of being produced by folding sheet material and comprising side walls, the development of said side walls constituting a strip with straight-lined and unbroken upper and lower edges parallel to each other, said container including at least two bodies superimposed one on the other, the tops and the bottoms of said bodies being arranged parallel to each other, and the top circumference of the lower body being identical with the bottom circumference of the upper body, at least one of said bodies including at least one partial zone of its entire height, defined by two parallel cross-sectional planes, said partial zone comprising other edges extending from one of said planes to the other and lateral partial surfaces between said other edges respectively, at least two of said other edges having no plane in common with each other, and at least one portion of one of the circumferences of said planes being inwardly protruding.

9. A container as claimed in claim 8 in which at least one of said bodies comprises side walls, outwardly protruding edges and inwardly protruding edges, the development of said side walls constituting a parallelogram, said parallelogram being subdivided by said outwardly protruding edges in a plurality of triangles having their bases alternately on the upper and lower sides respectively of said parallelogram, and partial parallelograms between said triangles, said inwardly protruding edges being coincident with the longer diagonals of said partial parallelograms.

10. A container capable of being produced by folding sheet material and comprising side walls, the development of said side walls constituting a strip with straight-lined and unbroken upper and lower edges parallel to each other, said container including at least two bodies superimposed one on the other, the tops and the bottoms of said bodies being arranged parallel to each other, and the top circumference of the lower body being identical with the bottom circumference of the upper body, each of said two bodies including at least one partial zone of its entire height, defined by two parallel cross-sectional planes, said partial zone comprising other edges extending from one of said planes to the other and lateral partial surfaces between said other edges respectively, at least two of said other edges having no plane in common with each other, and at least one portion of one of the circumferences of said planes being inwardly protruding, at least one of the lateral partial surfaces of one of said two bodies having the same inclination as and forming the continuation of one of said lateral partial surfaces of said other body.

PAUL RINKEL.